Patented Feb. 2, 1943

2,309,624

UNITED STATES PATENT OFFICE 2,309,624

BETA-ALKOXYBUTYROGUANAMINES

Margaret Humm Bradley, Old Greenwich, Conn., assignor to American Cyanamid Company, New York, N. Y., a corporation of Maine No Drawing. Application August 30, 1941, Serial No. 409,134

6 Claims. (Cl. 260—248)

This invention relates to β-alkoxybutyroguanamines and methods of making them.

Some guanamines have been made by the reaction of esters of organic carboxylic acids with biguanide. For the most part a catalyst, such as a metal alkoxide has been necessary in order to obtain good yields. A more recent process for the production of unsaturated guanamines is described in the copending application of Thurston, Serial No. 409,123 filed August 30, 1941. This application described the production of α,β-unsaturated guanamines by the reaction of esters of α,β-unsaturated organic carboxylic acids with biguanide and the surprising observation that these esters appear to be activated and react very rapidly with biguanide giving excellent yields of the alkylene guanamines without the use of a condensing agent.

The present invention is based on the observation that when it was attempted to prepare an unsaturated guanamine by the reaction of an ester of crotonic acid or methacrylic acid with biguanide, the unsaturated guanamine was not obtained. On the contrary, in the reaction the alcohol of the ester group or the alcohol used to dissolve the biguanide, added on to the double bond to produce a β-alkoxybutyroguanamine. This anomalous behavior appears to be limited to esters of crotonic and methacrylic acids and makes it possible to produce alkoxybutyroguanamines from cheap materials without the necessity of preparing the expensive esters of β-alkoxycarboxylic acids as intermediates which would be necessary if the more normal process of making the guanamines were carried out.

The present invention is directed to β-alkoxybutyroguanamines as new chemical compounds regardless of whether they are prepared by the new process of the present invention or by the use of esters of β-alkoxybutyric acid. In a more specific aspect, however, the present invention includes the new process of making β-alkoxybutyroguanamines as a specific process feature.

In carrying out the present invention various alcohols may be used either to dissolve the biguanide or to be present in the ester, or both. The process is not critical but is limited to lower normal alcohols. However, the reactivity of different alcohols varies. In general, methanol is extremely reactive and the corresponding reaction takes place at room temperature. Alcohols higher than methanol, such as ethanol, propanol, allyl alcohol, and the like, do not react quite so rapidly and preferably gentle heating is employed in such cases. When alcohols of too high molecular weight are used, the solubility of biguanide in the alcohol decreases and the process, while included broadly in the present invention, is technically less satisfactory. Therefore the preferred β-alkoxybutyroguanamines of the present invention are those corresponding to the lower normal paraffin alcohols having one to three carbon atoms.

The invention will be described in greater detail in conjunction with the following specific examples which are typical illustrations of the process.

Example 1

β-Methoxybutyroguanamine

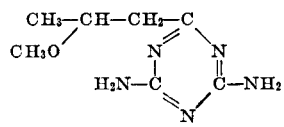

Fifty parts of biguanide were dissolved in 320 parts of methanol clarified by filtration, and 55 parts of methyl crotonate were added. On standing overnight, crystals formed which were removed by filtration. Further amounts were recovered by concentrating the filtrate. The crude product was recrystallized from ethyl actetate, methanol and acetone. The crystals were colorless, melting at 187–188° C. The yield was about 73%.

Example 2

β-Ethoxybutyroguanamine

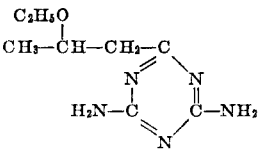

Twenty-five parts of biguanide were dissolved in 160 parts of ethanol and the solution clarified by filtration. Thirty parts of methyl crotonate were then added and the mixture was allowed to stand until the crystallization was complete. The crystals were removed by filtration and further product was obtained by concentrating the filtrate. The crude material was recrystallized from water, ethyl acetate and acetone, and the pure product appeared in the form of fine white crystals, having a melting point of 197–198° C. The yield was about 50%.

Example 3

β-Methoxyisobutyroguanamine

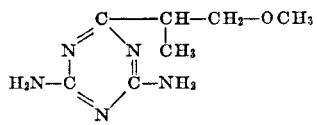

Twenty-five parts of biguanide were dissolved in 160 parts of methanol and 30 parts of methyl methacrylate were added. After standing a few hours a colorless crystalline solid began to precipitate. When crystallization was complete, methacryloguanamine of the following formula:

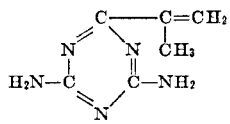

was obtained in a yield of 61%. The filtrate was cooled in ice water and eight parts of β-methoxyisobutyroguanamine melting at 155° C. was obtained. After recrystallization from the following solvents, water, ethyl acetate, ethanol and acetone, and thoroughly drying, the product melted at 166° C.

The examples show the reaction of unsubstituted biguanide with the crotonic ester. These compounds are of great practical interest because when combined with formaldehyde, water-soluble, heat-convertible resins are obtained which are of importance in textile finishing.

What I claim is:

1. A β-alkoxybutyroguanamine.
2. β-Methoxybutyroguanamine.
3. β-Ethoxybutyroguanamine.
4. A process of preparing β-alkoxybutyroguanamines which comprises reacting a biguanide in solution in an alcohol, the alkoxy group of which is desired, with an ester of an acid included in the group consisting of crotonic and methacrylic acids.
5. A method of preparing β-methoxybutyroguanamine which comprises reacting biguanide in methanol solution with an ester of crotonic acid.
6. A method of preparing β-ethoxybutyroguanamine which comprises reacting biguanide in ethanol solution with an ester of crotonic acid.

MARGARET HUMM BRADLEY.